United States Patent
Moore, Jr. et al.

(10) Patent No.: US 11,974,002 B2
(45) Date of Patent: Apr. 30, 2024

(54) APPARATUS, SYSTEM, METHOD, AND COMPUTER-READABLE RECORDING MEDIUM FOR AUTOMATIC ROUTING OF AN AUDIO OUTPUT

(71) Applicant: ARRIS Enterprises LLC, Suwanee, GA (US)

(72) Inventors: Richard Moore, Jr., Harleysville, PA (US); Mallika Subramanyam, Warrington, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 25 days.

(21) Appl. No.: 17/130,642

(22) Filed: Dec. 22, 2020

(65) Prior Publication Data
US 2021/0204015 A1    Jul. 1, 2021

Related U.S. Application Data

(60) Provisional application No. 62/954,067, filed on Dec. 27, 2019.

(51) Int. Cl.
*H03G 3/20*  (2006.01)
*G06F 3/16*  (2006.01)
(Continued)

(52) U.S. Cl.
CPC ....... *H04N 21/42203* (2013.01); *G06F 3/165* (2013.01); *G06F 3/167* (2013.01); *G10L 15/22* (2013.01); *G10L 2015/223* (2013.01)

(58) Field of Classification Search
CPC ...... H04R 29/001; H04R 3/00; H04R 1/1041; H03G 3/20
(Continued)

(56) References Cited

U.S. PATENT DOCUMENTS

2006/0294556 A1*  12/2006  Chen ................. G06F 1/3287
                                                725/89
2014/0132844 A1    5/2014  Burns et al.
(Continued)

FOREIGN PATENT DOCUMENTS

EP        2 953 372        12/2015

OTHER PUBLICATIONS

Notification of Transmittal of The International Search Report and The Written Opinion of the International Searching Authority dated Mar. 10, 2021 in International Application No. PCT/US2020/066624.
(Continued)

*Primary Examiner* — George C Monikang
(74) *Attorney, Agent, or Firm* — Wenderoth, Lind & Ponack, L.L.P.

(57) ABSTRACT

An apparatus, system, method, and computer-readable recording medium for automatic routing of an audio output using a smart media device (SMD), which includes receiving a request for audio content or audio and visual content, obtaining the audio content or the audio and visual content requested, and determining a power state of an audio/video (AV) output device. If the power state is determined to be ON, the audio content or the audio and visual content is automatically routed to the AV output device, and if the power state is determined to be OFF, the audio content is automatically routed to the SMD for output. If the power state is determined to be OFF and the request is for audio and visual content, the power state of the AV output device is controlled ON, and the audio and visual content is routed to the AV output device.

19 Claims, 4 Drawing Sheets

(51) Int. Cl.
*G10L 15/22* (2006.01)
*H04N 21/422* (2011.01)
*H04R 3/00* (2006.01)

(58) Field of Classification Search
USPC .............................. 381/58, 59, 110, 122, 123
See application file for complete search history.

(56) References Cited

U.S. PATENT DOCUMENTS

| | | | | |
|---|---|---|---|---|
| 2015/0296291 A1* | 10/2015 | Macours | ................ | H04S 7/308 381/74 |
| 2015/0350773 A1* | 12/2015 | Yang | ................... | H04N 21/439 381/77 |
| 2018/0278999 A1 | 9/2018 | David et al. | | |

OTHER PUBLICATIONS

International Preliminary Report on Patentability dated Jun. 28, 2022 in International (PCT) Application No. PCT/US2020/066624.
Communication pursuant to Article 94(3) EPC issued Feb. 19, 2024 in corresponding European Patent Application No. 20842515.7.

* cited by examiner and # APPARATUS, SYSTEM, METHOD, AND COMPUTER-READABLE RECORDING MEDIUM FOR AUTOMATIC ROUTING OF AN AUDIO OUTPUT

TECHNICAL FIELD

The subject matter of the present disclosure relates generally to the implementing of a smart media device (SMD) for routing audio and visual content in a residential network.

BACKGROUND

Smart media devices (SMD) are typically integrated into a residential network for interacting with a user, obtaining content and information, and communicating with other connected devices for providing the content and the information to the user.

Typical SMDs have on-board or local audio speakers for outputting requested audio content and information. However, there is a question of whether the default audio output should be routed to the HDMI out port or to the local speakers of the SMD, when an attached output device such as an attached television (TV) is on or off.

Previous solutions always routed the default audio output to the same output destination. Therefore, if a user wanted to route the default audio output to a different destination, the previous solutions would require the user to manually select the routing of the default audio output (e.g., HDMI output port, connected Bluetooth speaker, or local speakers), regardless of whether the attached output device such as an attached TV is on or off.

Thus, it would be advantageous and an improvement over the relevant technology to provide an apparatus, system, method, and computer program that automatically and efficiently controls the routing of a default audio output based on the power state of output devices such as an attached TV connected in a residential network.

SUMMARY

An embodiment of the present disclosure provides a method for automatic routing of an audio output using a smart media device (SMD) in a residential network. The method includes receiving a request for audio content or audio and visual content, obtaining the audio content or the audio and visual content requested, and determining a power state of an audio/video (AV) output device for outputting the audio content or the audio and visual content requested. If the power state is determined to be ON, the audio content or the audio and visual content is automatically routed to the AV output device for output, and if the power state is determined to be OFF, the audio content is automatically routed to the SMD for output. On the other hand, if the power state is determined to be OFF and the request is for audio and visual content, the method includes controlling the power state of the AV output device to be ON, and routing the audio and visual content to the AV output device for output.

An embodiment described in the present disclosure provides a system for automatic routing of an audio output in a residential network. The system includes an AV output device for outputting visual and audio content, and including a communication interface; and an SMD configured with a microphone, local speakers, a communication interface, a network interface for connecting to a network, a hardware processer, and a memory storing one or more programs. Additionally, a communication connection is configured to establish a connection between the communication interface of the AV output device and the communication interface of the SMD.

The one or more programs when executed by the hardware processor control the SMD to: receive a request for audio content or audio and visual content using the microphone; obtain the audio content or the audio and visual content requested using the network interface; and determine a power state of an AV output device for outputting the audio content or the audio and visual content requested using the communication interface. If the power state is determined to be ON, the audio content or the audio and visual content is automatically routed to the AV output device for output, and if the power state is determined to be OFF, the audio content is automatically routed to the SMD for output by the local speakers.

In an embodiment of the present disclosure, the SMD is a set-top box and the AV output device is a television set (TV). The communication interfaces of the SMD and AV output device are high-definition multimedia interfaces (HDMIs) and communications between the SMD and the AV output device are implemented using an HDMI consumer electronic control (CEC) protocol.

An embodiment described in the present disclosure provides an SMD for automatic routing of an audio output in a residential network. The SMD includes a microphone; local speakers; a communication interface for connecting to an AV device; a network interface for connecting to an network; a hardware processer; and a memory storing one or more programs. The one or more programs when executed by the hardware processor control the SMD to: receive a request for audio content or audio and visual content using the microphone; obtain the audio content or the audio and visual content requested using the network interface; and determine a power state of the AV output device for outputting the audio content or the audio and visual content requested using the communication interface. If the power state is determined to be ON, the audio content or the audio and visual content is automatically routed to the AV output device for output, and if the power state is determined to be OFF, the audio content is automatically routed to the SMD for output by the local speakers.

An embodiment described in the present disclosure provides a non-transitory computer-readable recording medium in an SMD for automatic routing of an audio output in a residential network. The non-transitory computer-readable recording medium stores one or more programs which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
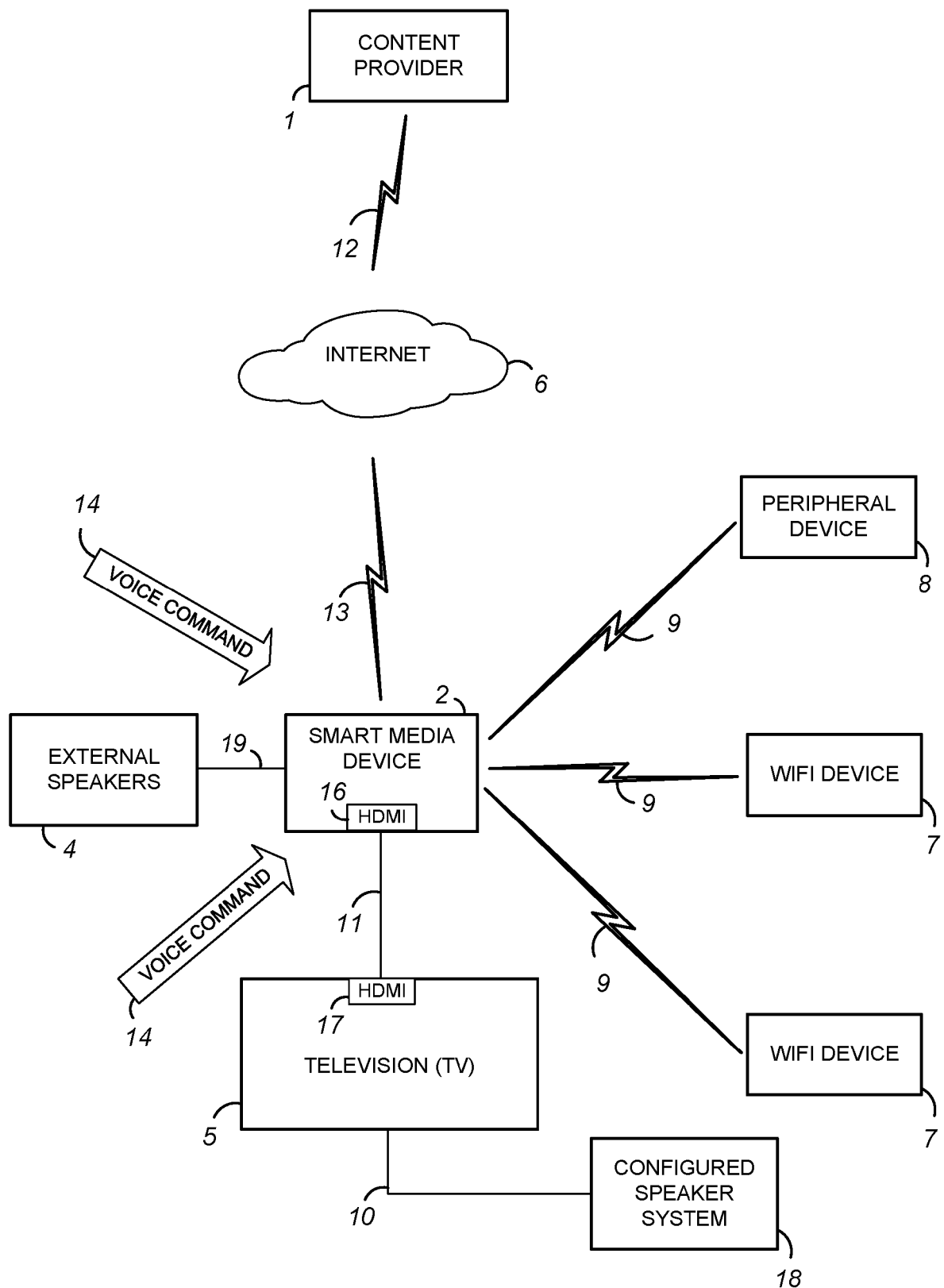
FIG. 1 is a schematic diagram of a system for automatic routing of an audio output using an SMD in a residential network according to an embodiment of the present disclosure.

FIG. 1 is a schematic diagram of a system for automatic routing of an audio output using a smart media device in a residential network according to an embodiment of the present disclosure.

As shown in FIG. 1, the system includes a residential network in which a smart media device (SMD) 2 configured with external speakers 4 is connected to a content provider 1 through the Internet 6, an audio/video output device such as a television set (TV) 5 configured with a speaker system 18, one or more wireless devices 7, and a peripheral device 8. It is contemplated by the present disclosure that the residential network is operating as a local area network (LAN), wireless local area network, or virtual local area network (VLAN), which can be connected to one or more content providers 1 via the Internet 6.

The SMD 2 is a wireless electronic device that can interact with a user, obtain content from the content provider 1, and route the content received from the content provider 1 to other devices in the residential network (e.g., TV 5, wireless devices 7, and peripheral device 8). It is contemplated by the present disclosure that the SMD 2 can be a traditional Internet Protocol/Quadrature Amplitude Modulator (IP/QAM) set-top box (STB) that is capable of decoding audio/video content, and playing over-the-top (OTT) or multiple system operator (MSO) provided content. QAM is a digital television standard using quadrature amplitude modulation and is a format by which digital cable channels are encoded and transmitted via cable television providers.

As shown in FIG. 1, the SMD 2 is connected to a TV 5 over an HDMI connection 11 via respective HDMI interfaces 16, 17, such that the SMD 2 and the TV can communication over the HDMI connection 11 using consumer electronic control (CEC) messaging. For example, the SMD 2 can be notified about the power state of the TV 5 using CEC messaging over the HMDI connection 11. The SMD 2 is also connected to external speakers 4 via connection 19 using, for example, a Sony/Philips Digital Interconnect Format (SPDIF), which is a default format for passing a digital sound signal between different devices. The connection 19 can also be implemented using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is contemplated by the present disclosure that the connection 19 can be implemented using a wireless connection in accordance with a Bluetooth protocol or other short range protocols that operate in accordance with a wireless technology standard for exchanging data over short distances using short-wavelength Ultra high frequency (UHF) radio waves from 2.4 to 2.485 GHz.

The SMD 2 is configured with local speakers (e.g., smart speaker or in built speaker), far field voice (FFV) capability such as an FFV software or algorithm, a microphone, a digital signal processor (DSP), and software or algorithms to implement a smart assistant (e.g., Alexa, Google assistant, or some other assistant module or program). The components of the SMD 2 are discussed in more detail with reference to FIG. 2. The typical way of interacting with the SMD 2 is via a user's voice using a voice command 14. The response to the voice command 14 by the SMD 2 can be in the form of a voice or audio output, audio content, audio+visual (including video) content, or voice or audio+action (e.g., adjust thermostat, turn on or off lights, or other similar action).

The connections 13 between the SMD 2 and the Internet 6 can be implemented using a DSL connection, a cable modem, a broadband mobile phone network, or other similar connections. Additionally, the connection 13 can be implemented using a wireless connection that operates in accordance with, but is not limited to, IEEE 802.11 protocol, an RF4CE protocol, ZigBee protocol, Z-Wave protocol, or IEEE 802.15.4 protocol. It is also contemplated by the present disclosure that the SMD 2 is capable of providing connections between the residential network and a wide area network (WAN), a local area network (LAN), a virtual private network (VPN), metropolitan area networks (MANs), personal area networks (PANs), and wireless local area networks (WLANs), system area networks (SANs), a public switched telephone network (PTSA), a global Telex network, or a 2G, 3G. 4G or 5G network using connection 13. The connection 12 between the Internet 6 and the content provider 1 can be implemented using a connection that operates in accordance with a WAN, a LAN, a VPN, MANs, PANs, WLANs, SANs, a PTSA, a global Telex network, or a 2G, 3G, 4G or 5G network. The content provider 1 can be a cable television provider, a satellite television provider, an internet service provider, or multiple system operators.

The TV is, for example, a standard cathode ray tube (CRT), liquid crystal display (LCD), light emitting diode (LED), plasma, or organic LED TV configured with speakers 18 such as a surround sound system. The connection 10 between the TV 5 and the configured speaker system 18 is, for example, a SPDIF connection, which is a default format for passing a digital sound signal between different devices. The connection 10 can also be implemented using a wireless connection in accordance with a Bluetooth protocol or other short range protocols that operate in accordance with a wireless technology standard for exchanging data over short distances using short-wavelength UHF radio waves from 2.4 to 2.485 GHz. Additionally, the connection 10 can be implemented using a wireless connection that operates in accordance with, but is not limited to, IEEE 802.11 protocol, an RF4CE protocol, ZigBee protocol, Z-Wave protocol, or IEEE 802.15.4 protocol.

As shown in FIG. 1, the SMD 2 also routes data, content, and messages to wireless devices 7 and a periperhal device 8 in the residential network. The wireless devices 7 are, for example, client devices that include, but are not limited to, a computer, a portable device, an electronic tablet, a smart phone, smart speakers, or other wireless hand-held consumer electronic device capable of executing and outputting audio and visual content received from the SMD 2. The peripheral device 8 can include, but is not limited to, an Internet of Things (Iot) device, Bluetooth thermometer, wearable electronic device, camera, thermostat, household appliance, or other similar device capable of wirelessly communicating with the SMD 2. The peripheral device 8 can also be a computer, a portable device, an electronic tablet, a smart phone, smart speakers, or other wireless hand-held consumer electronic device capable of executing and outputting audio and visual content received from the SMD 2.

The connections 9 between the SMD 2 and the wireless devices 7 and between the SMD 2 and the peripheral device 8 can be implemented using a wireless connection in accordance with a Bluetooth protocol or other short range protocols that operate in accordance with a wireless technology standard for exchanging data over short distances using short-wavelength UHF radio waves from 2.4 to 2.485. Additionally, the connections 9 can also be implemented using a wireless connection that operates in accordance with, but is not limited to, IEEE 802.11 protocol, RF4CE protocol, ZigBee protocol, Z-Wave protocol, or IEEE 802.15.4 protocol. In FIG. 1, only two wireless devices 7 and one peripheral device 8 are shown. However, it is contemplated by the present disclosure that there could be any number of wireless devices 7 and peripheral devices 8 connected in the residential network of FIG. 1.

Figure 2:
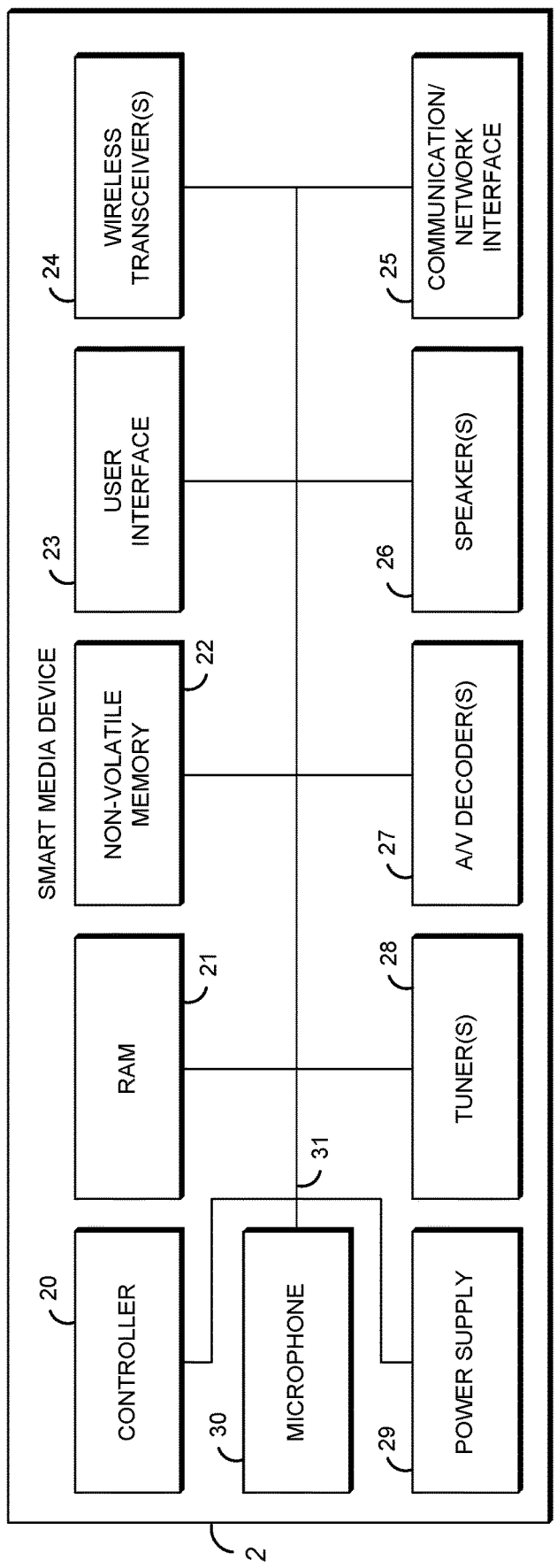
FIG. 2 illustrates a more detailed schematic diagram of an exemplary SMD for automatic routing of an audio output in the residential network according to an embodiment of the present disclosure.
Figure 3:
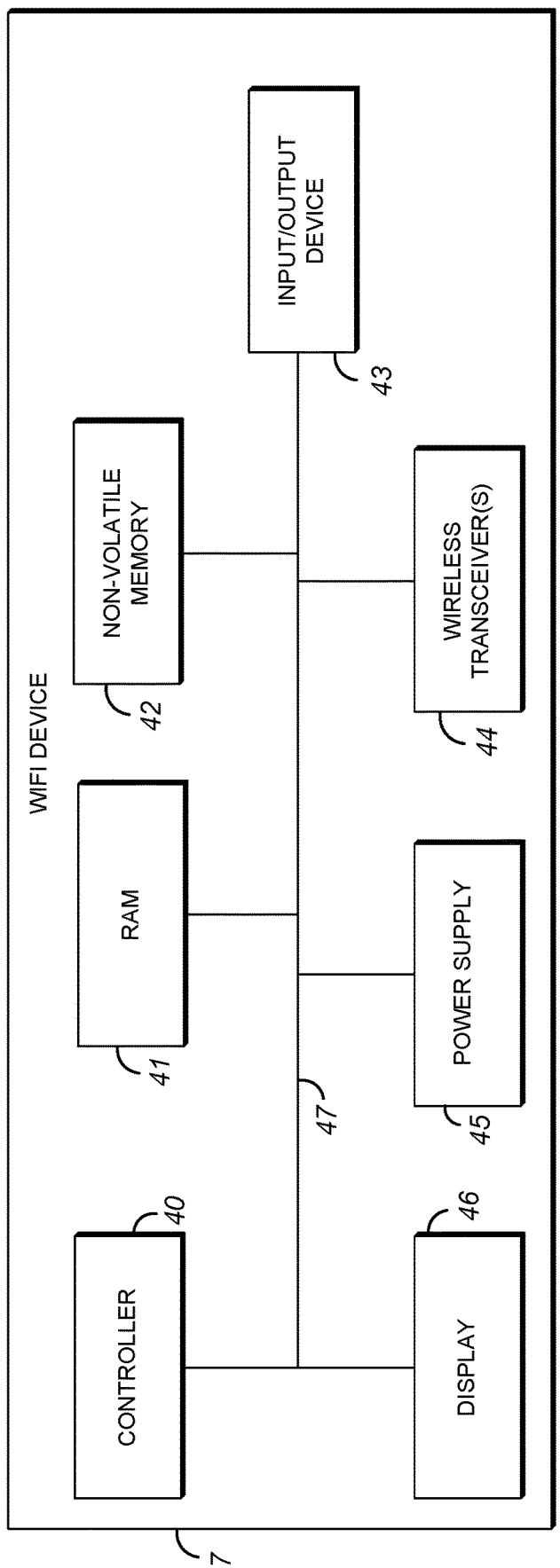
FIG. 3 illustrates a more detailed schematic diagram of an exemplary wireless device in the residential network according to an embodiment of the present disclosure.

A detailed description of the exemplary internal components of the SMD 2, and the wireless device 7 shown in FIG. 1 will be provided in the discussion of FIGS. 2 and 3. It is contemplated by the present disclosure that the peripheral device 8 can include similar internal components as the wireless device 7, such that the wireless device 7 discussed with reference to FIG. 3 is also representative of the internal components of the peripheral device 8.

In general, it is contemplated by the present disclosure that the SMD 2, the wireless devices 7, and the peripheral device 8 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the SMD 2, the wireless devices 7, and the peripheral device 8 can be adapted to execute any operating system, including Linux, UNIX, Windows, MacOS, DOS, and ChromOS as well as virtual machines adapted to virtualize execution of a particular operating system, including customized and proprietary operating systems. The SMD 2, the wireless devices 7, and the peripheral device 8 are further equipped with components to facilitate communication with other computing devices over the one or more network connections to local and wide area networks, wireless and wired networks, public and private networks, and any other communication network enabling communication in the system.

FIG. 2 illustrates a more detailed schematic diagram of an exemplary SMD for automatic routing of an audio output in the residential network according to an embodiment of the present disclosure.

The SMD 2 is a wireless electronic device that can interact with a user, obtain content from the content provider 1, and route the content received from the content provider 1 to other devices in the residential network (e.g., TV 5, wireless devices 7, and peripheral device 8). The SMD 2 includes components, circuits and software for receiving, decoding, storing, converting, and outputting the A/V content to the TV 5 and to other external devices (e.g., wireless devices 7 and peripheral device 8). It is contemplated by the present disclosure that the SMD 2 can be, for example, a traditional IP/QAM set-top box that includes components, circuits and software for decoding audio/video content, and playing OTT or MSO provided content. The SMD 2 can be implemented within another electronic device such as television, a computer, a portable device, an electronic tablet, or other digital receiver set.

As shown in FIG. 2, the SMD 2 includes a controller 20, a random access memory (RAM) 21, a non-volatile memory 22, a user interface 23, one or more wireless transceivers 24, a communication and network interface 25, one or more speakers 26, one or more audio/video (A/V) decoders 27, one or more tuners 28, a power supply 29, and microphone 30. The controller 20 controls the general operations of the SMD 2 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the SMD 2.

The RAM 21 can be implemented as a working memory for the controller 20 and the non-volatile memory 22 can be provided for the storage of program code, software, or algorithms for implementing decoding audio/video content, OTT or MSO provided content, implementing FFV capability, and a smart assistant (e.g., Alexa, Google assistant, or some other assistant module or program). It is contemplated by the present disclosure that the non-volatile memory 22 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The RAM 21 and the non-volatile memory 22 can be used to store any type of data, instructions, software, algorithms, processes, or operations for controlling the general functions of the SMD 2 and for performing operations associated with automatic routing of audio and visual content in the residential network.

The user interface 23 includes, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the SMD 2. The one or more wireless transceiver 24 are, for example, Wi-Fi WLAN interface radio transceivers, or in-home LTE (Long Term Evolution) transceivers that outputs signals of selected channels and include various network cards, interfaces, and circuitry implemented in software and/or hardware to enable communications between the SMD 2 and the other wireless devices in the residential network via connection 9 (e.g., wireless devices 7 and peripheral device 8) as well as between the SMD 2 and the external speakers via connection 19.

The wireless transceivers 24 can include a transceiver that operates in accordance with a Bluetooth protocol operating in accordance with a wireless technology standard for exchanging data over short distances using short-wavelength UHF radio waves from 2.4 to 2.485 GHz at a rate of approximately 1-2 megabits per second and at a range of approximately 1-30 meters. However, the data rate and distance for exchanging data between the SMD 2 and other wireless devices in the residential network depending on the generation of Bluetooth technology being implemented. The wireless transceivers 24 can also include a transceiver that operates in accordance with, but is not limited to, IEEE 802.11 protocol, an RF4CE protocol, ZigBee protocol, Z-Wave protocol, or IEEE 802.15.4 protocol.

The communication and network interface 25 includes various network cards, interfaces, and circuitry implemented in software and/or hardware to enable communications between, for example, the SMD 2 and the TV, between the SMD 2 and external speakers, and between the SMD 2 and the Internet 6. To this end, the various network cards, interfaces, and circuitry of communication and network interface 25 enable communications using connection 11 via HDMI such that the SMD 2 and the TV 5 can communication over the connection 11 using consumer electronic control (CEC) messaging. For example, the SMD 2 can be notified about the power state of the TV 5 using CEC messaging over connection 11. The various network cards, interfaces, and circuitry of communication and network interface 25 enable communications via connection 19 using, for example, an SPDIF connection, which is a default format for passing a digital sound signal between different devices.

Additionally, the communication and network interface 25 includes various network cards, interfaces, and circuitry implemented in software and/or hardware of communication and network interface 25 enables communications between the SMD 2 and the Internet 6 via connection 13 using a DSL connection, a cable modem, a broadband mobile phone network, or other similar connections. It is also contemplated by the present disclosure that the communication and network interface 25 includes various network cards, interfaces, and circuitry implemented in software and/or hardware to enable communications between the SMD 2 and the Internet 6 using a protocol in accordance with a WAN, a LAN, a VPN, MANs, PANs, and WLANs, SANs, a PTSA, a global Telex network, or a 2G, 3G, 4G or 5G network using connection 13.

The one or more speakers 26 can be standard built-in wired or wireless speakers that convert audio signals to sound. That is, the one or more speakers 26 can be used to output audio content received from the content provider 1 or output sound in response to a voice command 14 by a user. The one or more A/V decoders 27 decode selected signals from the content provider 2 so that the A/V content is usable for use by other devices in the residential network (e.g., TV 5, wireless devices 7, and peripheral device 8). It is contemplated by the invention that the A/V decoders are capable of processing the A/V content into multiple data formats such as, for example, converting from MPEG-4/advanced audio coding (AAC) to MPEG-2/MP3.

The one or more tuners 28 tune selected channels for receiving A/V content based on the input instruction received using a voice command 14 or using the user interface 23 on the SMD 2. For example, the tuners 28 convert a radio frequency digital television transmission into audio and video data signals which can be further processed to produce audio content such as sound and visual content such as picture or video. The tuners 28 are implemented to tune different television standard formats (e.g., PAL, NTSC, ATSC, SECAM, DVB-C, DVB-T, DVB-T2, ISDB, T-DMB, and open cable). It is contemplated by the present disclosure that the tuners 28 can perform internet video streaming and include multiple tuners implemented for tuning multiple selected channels.

The power supply 29 includes a self-contained power source such as a battery pack with an interface to be powered through an electrical charger connected to an outlet (e.g., either directly or by way of another device). The power supply 29 can also include a rechargeable battery that can be detached allowing for replacement such as a nickel-cadmium (NiCd), nickel metal hydride (NiMH), a lithium-ion (Li-ion), or a lithium Polymer (Li-pol) battery. The microphone 30 is a standard built-in microphone for converting sound waves into electrical energy such as a piezoelectric microelectromechanical system (MEMS) microphone. Communication between the components (e.g., 20-30) of the SMD 2 are established using the internal electrical bus 31.

With the SMD 2 of FIG. 2, the default audio output can be routed to, for example, the HDMI out port (e.g., to the TV 5) or the local or on-board speakers 4, 26, of the SMD 2 based on power state of the TV 5 attached to the HDMI out port. For example, when the TV 5 is turned on or off, it notifies the SMD 2 of its power via CEC messaging over HDMI using connection 11. The SMD 2 can automatically route the default audio output to the HDMI out port when the TV's power state is ON. On the other hand, the SMD 2 can automatically route the default audio output to the local or on-board speakers 4, 26 of the SMD 2 when the TV's power state is OFF.

Conversely, conventional residential networks always routed the default audio output to the same destination regardless of whether the attached TV is on or off, which required the use to manually select the routing of the default audio output (e.g., HDMI output port, connected Bluetooth speaker, or local speakers). The SMD 2 of FIG. 2, provides an automatic route selection based the determined power state of the TV 5. The different "use cases" for routing the default audio output based on the power state of TV 5 will be discussed in more detail with reference to the flowchart of FIG. 4.

FIG. 3 illustrates a more detailed schematic diagram of an exemplary wireless device 7 in the residential network according to an embodiment of the present disclosure. It is contemplated by the present disclosure that internal components of the wireless device 7 can also be representative of the internal components of the peripheral device 8, which can also be a computer, a portable device, an electronic tablet, a smart phone, smart speakers, or other wireless hand-held consumer electronic device capable of executing and outputting audio and visual content received from the SMD 2. However, it is also contemplated by the present disclosure that the peripheral device 8 includes an Internet of Things (Iot) device, Bluetooth thermometer, wearable electronic device, camera, thermostat, household appliance, or other similar device capable of wirelessly communicating with the SMD 2.

The wireless device 7 includes a controller 40, a RAM 41, a non-volatile memory 42, a input/output device 43, a wireless transceiver 44, a power supply 45, and a display 46. The controller 40 controls the general operations of the wireless device 7 and includes, but is not limited to, a CPU, a hardware microprocessor, a multi-core processor, a single core processor, an FPGA, a microcontroller, an ASIC, a DSP, or other similar processing device capable of executing any type of instructions, algorithms, or software for controlling the operation and performing the functions of the wireless device 7.

The RAM 41 can be implemented as a working memory for the controller 40 and the non-volatile memory 42 can be provided for storage of program code, software, or algorithms for implementing the control and operations of the wireless device 7. The non-volatile memory 42 can also include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The input/output device 43 can include a user interface 29 such as, but not limited to, push buttons, a keyboard, or a keypad. The input/output device 43 can also include a display such as an LCD, a CRT, a TFT, an LED, an HD or other similar display device including a display device having touch screen capabilities so as to allow interaction between a user and the wireless device 7. Additionally, the input/output device 43 can include a speaker such as a standard built-in wired or wireless speaker that converts audio signals to sound. The one or more wireless transceivers 44 includes various network cards, interfaces, and circuitry implemented in software and/or hardware to enable communications between the wireless device 7 and the SMD 2 using a wireless connection via connection 9 in accordance with a Bluetooth protocol operating in accordance with a wireless technology standard for exchanging data over short distances using short-wavelength UHF radio waves from 2.4 to 2.485 GHz at a rate of approximately 1-2 megabits per second and at a range of approximately 1-30 meters.

Additionally, the one or more wireless transceivers 44 includes various network cards, interfaces, and circuitry implemented in software and/or hardware to enable communications in accordance with, but is not limited to, IEEE 802.11 protocol, an RF4CE protocol, ZigBee protocol, Z-Wave protocol, or IEEE 802.15.4 protocol. The power supply 45 includes a self-contained power source such as a battery pack with an interface to be powered through an electrical charger connected to an outlet (e.g., either directly or by way of another device). The power supply 45 can also include a rechargeable battery that can be detached allowing for replacement such as a NiCd, a NiMH, a Li-ion, or a Li-pol battery. The display 46 includes, but is not limited to, an LCD, a CRT, a TFT, an LED, or an HD or other similar display device including a display device having touch screen capabilities so as to allow interaction between a user and the wireless device 7. Communication between the components (e.g., 40-46) of the wireless device 7 are established using the internal electrical bus 47.

Figure 4:
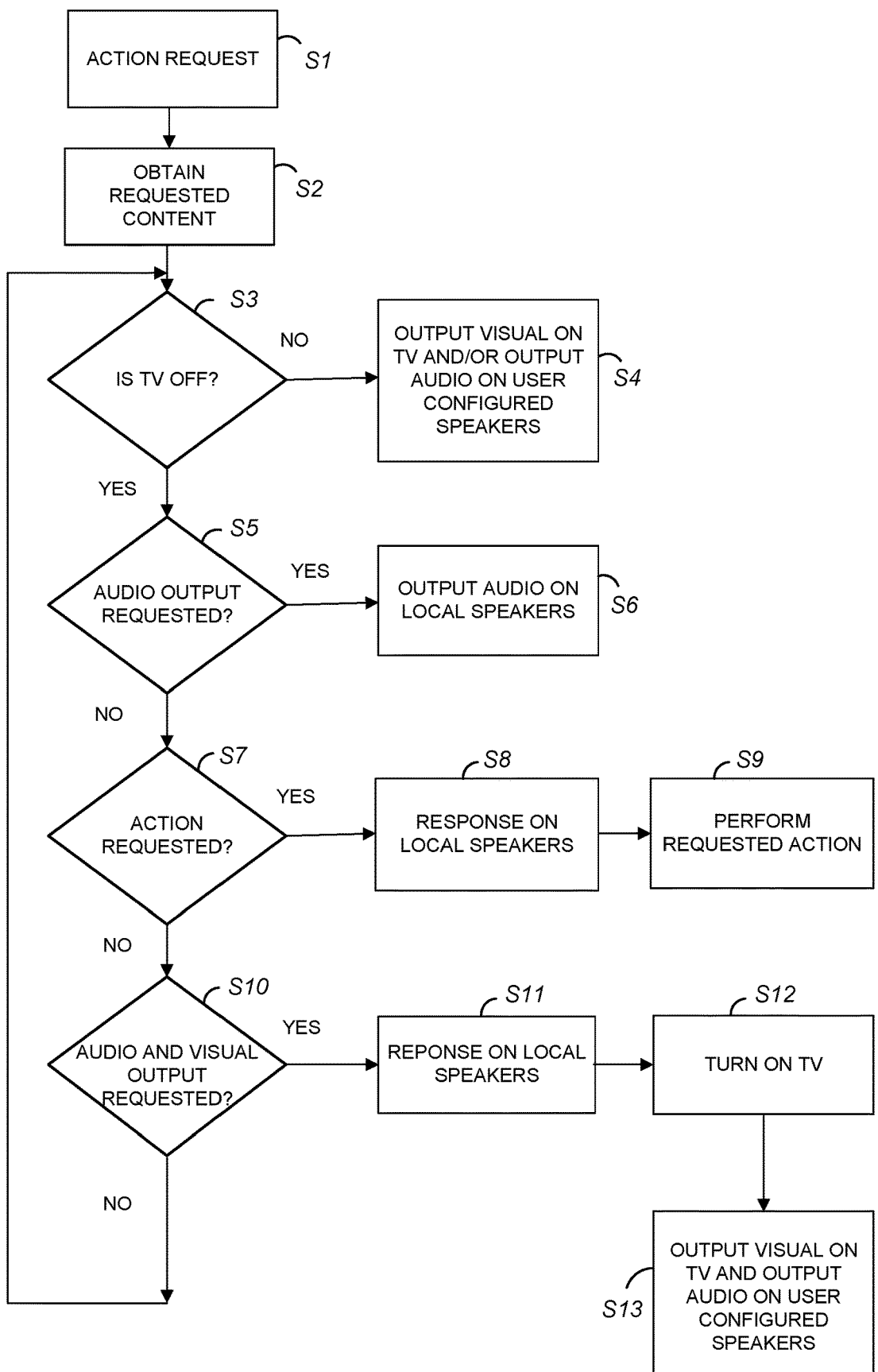
FIG. 4 illustrates a method for automatic routing of an audio output using an SMD in a residential network according to an embodiment of the present disclosure.

FIG. 4 illustrates a method for automatic routing of an audio output using a smart media device in a residential network according to an embodiment of the present disclosure.

In step 1, an action request is received by the SMD 2 as a voice command 14 from the user. The voice command 14 can be an action request for audio content, visual content, a combination of audio and visual content, or for an action (e.g., no audio or visual content) to be performed in the residential network. The SMD 2 implements logic, software, and hardware that is able to receive the voice command 14 and determine the action requested (e.g., type/action) using, for example, the microphone 30, the controller 20, and FFV software and software to implement a smart assistant stored in non-volatile memory 22. In step S2, if audio or visual content is requested, the content is obtained by the SMD 2. For example, the SMD 2 obtains the requested content (e.g., audio content or audio and visual content) using, for example, connection 13 to the Internet 6. Before, providing the requested content, the SMD 2 determines the power state of the TV 5, in step S3. The SMD 2 can determine the power state of the TV via the HDMI connection 11 and CEC messaging. Based on the power state of the TV 5 and the action requested, the SMD 2 can perform various automatic operations. For example, if the SMD 2 determines in step S3 that the power state of the TV is ON and audio content or audio and visual content is requested, the SMD 2 will implement, for example, the FFV software and/or the smart assistant software to respond to the user's action request using either the SMD's speaker 4, 26 or the speakers 18 configured with the TV 5 and output the audio content or the audio and visual content to the TV 5.

During normal TV operations (e.g., TV power ON), the acknowledgement of the action request from the SMD 2 is done using the FFV software and/or the smart assistant software using the local speakers 4, 26 of the SMD 2 or the configured TV speakers 18 (e.g., via HDMI output port). It is also contemplated by the present disclosure that the audio content can be output to the local speakers 4, 26 of the SMD 2, the configured speakers 18 of the TV 5, or to other peripheral speaker devices in the residential network (e.g., wireless device 7 and peripheral device 8). However, during normal TV operations (e.g., TV is ON), the visual content will be output to the TV 5. Additionally, although the SMD 2 will automatically route the audio content based on the power state of the TV 5, the present disclosure does not preclude the ability of the user to manually select the audio output device.

The following are examples of the automatic operations performed by the SMD 2, when the power state of the TV is ON, as in steps S1-S4.

Example 1 with TV ON

Voice Command: "what's the weather today?"
    Acknowledgement from SMD output to local speakers of SMD or output to configured speakers of TV, and
    Visual content for weather output to TV.

Example 2 with TV ON

Voice Command: "what's on my calendar today?"
    Acknowledgement from SMD output to local speakers of SMD or output to configured speakers of TV, and
    Visual content for calendar output on TV.

Example 3 with TV ON

Voice Command: "play program XYZ from channel MNO"
    Acknowledgement from the SMD output to local speakers of the SMD or output to configured speakers of TV,
    Video content for TV program output to TV, and
    Audio content for TV program output to configured speakers of TV.

Example 4 with TV ON

Voice Command: "play XYZ song"
    Acknowledgement from SMD output to local speakers of SMD,
    Visual content for the music track output to TV, and
    Audio content for music output to configured speakers of TV.

In step S3, if it is determined by the SMD 2 that the power state of the TV 5 is OFF, then it is determined in step S5 if only audio content is requested. If it is determined that only audio content is requested, then the audio content is output to the local speakers 4, 26 of the SMD 2 in step S6. However, in step S5, if audio content is not requested, then it is determined by the SMD 2 if the voice command 14 is for an action to be performed or visual and audio content, in step S7. If an action is to be performed, then in steps S8, an acknowledgement response is provided by the SMD 2 on the local speakers 4, 26 of the SMD 2 and the requested action is performed, in step S9 (e.g., adjust thermostat, turn on or off lights, or other similar device). For example, the SMD 2 can send a control signal to the peripheral device 8, which includes an Internet of Things (Iot) device, Bluetooth thermometer, wearable electronic device, camera, thermostat, household appliance, or other similar device capable of wirelessly communicating with the SMD 2. Additionally, the SMD 2 can also send a control signal directly to a thermostat, a household appliance, or other similar device capable of wirelessly communicating with the SMD 2.

In steps S5 and S7, if it is determined that the voice command 14 by the user does not relate to just audio content or an action to be performed, then it is determined if both audio and video content are requested in step S10. If it is determined that both audio and video content are requested, then an acknowledgement response is provided by the SMD 2 on the local speakers 4, 26 of the SMD 2, in step S11. In step S12, the TV is controlled to turn ON, and, in step S13, the audio and visual content are output to the configured speakers of the TV 5.

The following are examples of the automatic operations performed by the SMD 2, when the power state of the TV is OFF, as in steps S5-S13.

Example 1 with TV OFF

Voice Command: "Turn on lights in xyz room"
Acknowledgement from SMD output to local speakers of SMD, and
Perform requested action.

Example 2 with TV OFF

Voice Command: "what's the weather today?"
Voice response by SMD output to local speakers of SMD.

Example 3 with TV OFF

Voice Command: "play program XYZ from channel MNO"
Voice response by SMD output to local speakers of SMD, Example 4 with TV OFF Voice Command: "play program XYZ on channel MNO"
Acknowledgement from SMD output to local speakers of SMD,
Switch TV ON,
Video content for TV program output to TV, and
Audio content for TV program output to configured speakers of TV.

Example 5 with TV OFF

Voice Command: "play music"
If audio track only:
Acknowledgement from SMD output to local speakers of SMD, and
Audio content for music output to local speakers of SMD.

If there is a visual content associated with the audio content (e.g., Youtube video):
Acknowledgement from SMD output to local speakers of SMD,
Turn TV ON,
Video content for TV program output to TV, and
Audio content for TV program output to configured speakers of TV.

With the above operations by the SMD 2, default audio can be routed to, for example, the HDMI out port (e.g., to the TV 5) or the local or on-board speakers 4, 26 of the SMD 2 based on power state of the TV 5 attached to the HDMI out port. For example, when the TV 5 is turned on or off, it notifies the SMD 2 of its power via CEC messaging over the HDMI connection 11. The SMD 2 automatically routes the default audio output to either the local speakers 4, 26 of the SMD 2 or the HDMI out port when the TV's power state is ON. On the other hand, the SMD 2 automatically routes the default audio output to the local or on-board speakers 4, 26 of the SMD 2 when the TV's power state is OFF.

The present disclosure can be implemented as any combination of an apparatus, a system, method, and a computer program on a non-transitory computer readable recording medium. The one or more processors can be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 4. For example, the one or more memories stores software or algorithms with executable instructions and the one or more processors can execute a set of instructions of the software or algorithms in association with performing automatic routing of content in a residential network according to the embodiments of the present disclosure. The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that can replace any of the above implemented technologies.

Additionally, the above description provides examples, and is not limiting of the scope, applicability, or configuration set forth in the claims. Changes can be made in the function and arrangement of elements discussed without departing from the spirit and scope of the disclosure. Various embodiments can omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method for automatic routing of an audio output using a smart media device (SMD) in a residential network, the method comprising:
   receiving a request for audio content or audio and visual content;
   obtaining the audio content or the audio and visual content requested;
   determining a power state of an audio/video (AV) output device for outputting the audio content or the audio and visual content requested; and
   if the power state is determined to be ON, automatically routing the audio content or the audio and visual content to one or more AV outputs of the AV output device,
   if the power state is determined to be OFF, automatically routing the audio content to one or more audio outputs of SMD, and
   if the power state is determined to be OFF and the request is for audio and visual content, controlling the power state of the AV output device to be ON, and automatically routing the audio and visual content to the AV output device for output.

2. The method according to claim 1, wherein the request for the audio content or the audio and visual content is received as a verbal or voice command.

3. The method according to claim 1, wherein the AV output device is a television set (TV), and the visual content requested is output using the TV and audio content requested is output using speakers configured with the TV.

4. The method according to claim 1, wherein the SMD outputs the audio content using local speakers configured with the SMD.

5. The method according to claim 1, further comprising receiving a request for an action to be performed in the residential network; and
performing the action requested using the SMD.

6. The method according to claim 1, further comprising outputting an audio response to the request for the audio content or the audio and video content using local speakers configured with the SMD or using speakers configured with the AV output device, depending on the power state of the AV output device.

7. A non-transitory computer-readable recording medium in a smart media device (SMD) for automatic routing of an audio output in a residential network, the non-transitory computer-readable recording medium storing one or more programs which when executed by a hardware processor perform steps comprising:
   receiving a request for audio content or audio and visual content;
   obtaining the audio content or the audio and visual content requested;
   determining a power state of an audio/video (AV) output device for outputting the audio content or the audio and visual content requested; and
   if the power state is determined to be ON, automatically routing the audio content or the audio and visual content to one or more AV outputs of the AV output device,
   if the power state is determined to be OFF, automatically routing the audio content to one or more audio outputs of the SMD, and
   if the power state is determined to be OFF and the request is for audio and visual content, controlling the power state of the AV output device to be ON, and automatically routing the audio and visual content to the AV output device for output.

8. The non-transitory computer-readable recording medium according to claim 7, wherein the request for the audio content or the audio and visual content is received as a verbal or voice command.

9. The non-transitory computer-readable recording medium according to claim 7, wherein the AV output device is a television set (TV), and the visual content requested is output using the TV and audio content requested is output using speakers configured with the TV.

10. The non-transitory computer-readable recording medium according to claim 7, wherein the SMD outputs the audio content using local speakers configured with the SMD.

11. The non-transitory computer-readable recording medium according to claim 7, further comprising receiving a request for an action to be performed in the residential network; and
performing the action requested using the SMD.

12. The non-transitory computer-readable recording medium according to claim 7, further comprising outputting an audio response to the request for the audio content or the audio and video content using local speakers configured with the SMD or using speakers configured with the TV, depending on the power state of the AV output device.

13. A system for automatic routing of an audio output in a residential network, the system comprising:

an audio/video (AV) output device for outputting visual and audio content, and including a communication interface;

a smart media device (SMD) configured with a microphone, local speakers, a communication interface, a network interface for connecting to a network, a hardware processer, and a memory storing one or more programs; and a communication connection configured to establish a connection between the communication interface of the AV output device and the communication interface of the SMD, wherein the one or more programs when executed by the hardware processor control the SMD to:

receive a request for audio content or audio and visual content using the microphone;

obtain the audio content or the audio and visual content requested using the network interface;

determine a power state of an AV output device for outputting the audio content or the audio and visual content requested using the communication interface; and if the power state is determined to be ON, automatically route the audio content or the audio and visual content to one or more AV outputs of the AV output device, if the power state is determined to be OFF, automatically route the audio content to the local speakers of the SMD, and if the power state is determined to be OFF and the request is for audio and visual content, control the power state of the AV output device to be ON, and automatically route the audio and visual content to the AV output device for output.

14. The system according to claim 13, wherein the SMD is a set-top box and the AV output device is a television set (TV).

15. The system according to claim 13, wherein the communication interfaces of the SMD and AV output device are high-definition multimedia interfaces (HDMIs) and communications between the SMD and the AV output device are implemented using an HDMI consumer electronic control (CEC) protocol.

16. The system accordingly to claim 13, wherein network interface is configured for establishing a connection to the Internet.

17. A smart media device (SMD) for automatic routing of an audio output in a residential network, apparatus comprising:

a microphone;

local speakers;

a communication interface for connecting to an audio/video (AV) device;

a network interface for connecting to an network;

a hardware processer; and a memory storing one or more programs, wherein the one or more programs when executed by the hardware processor control the SMD to:

receive a request for audio content or audio and visual content using the microphone;

obtain the audio content or the audio and visual content requested using the network interface;

determine a power state of the AV output device for outputting the audio content or the audio and visual content requested using the communication interface; and if the power state is determined to be ON, automatically route the audio content or the audio and visual content to one or more AV outputs of the AV output device, if the power state is determined to be OFF, automatically route the audio content to the local speakers of the SMD, and if the power state is determined to be OFF and the request is for audio and visual content, control the power state of the AV output device to be ON, and automatically route the audio and visual content to the AV output device for output.

18. The SMD according to claim 17, wherein the SMD is a set-top box.

19. The SMD according to claim 17, wherein the communication interface is a high-definition multimedia interface (HDMI) and communications between the SMD and the AV output device are implemented using an HDMI consumer electronic control (CEC) protocol.

* * * * *